Urinary excretion in human after oral administration
Test compound (II)
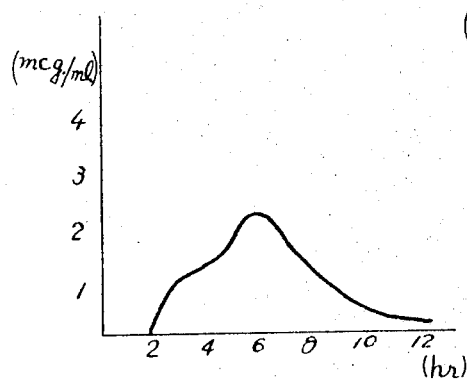
Recovery: 0.71%
Test compound (I)
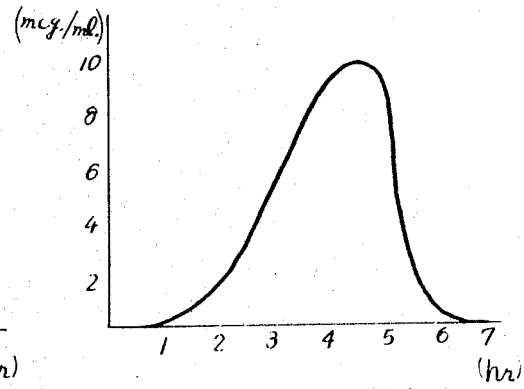
Recovery: 2.09%

United States Patent Office 3,455,913
Patented July 15, 1969

3,455,913
2-AMINO-1,3,4-OXADIAZOLE RING COMPRISING NITROFURANS
Akira Takai, Isamu Saikawa, Toyoo Maeda, Yutaka Kodama, Yasumasa Matsubara, Ikuko Takamichi, and Toshiko Wada, Toyama, Japan, assignors to Toyama Kagaku Kogyo Kabushiki Kaisha, Tokyo, Japan
Continuation-in-part of application Ser. No. 314,524, Oct. 7, 1963. This application Jan. 20, 1967, Ser. No. 610,651
Claims priority, application Japan, Oct. 15, 1962, 37/44,677; Nov. 16, 1962, 37/50,056, 37/50,057; Dec. 17, 1962, 37/55,353
The portion of the term of the patent subsequent to July 12, 1983, has been disclaimed
Int. Cl. C07d 99/04, 85/52, 5/30
U.S. Cl. 260—240                                      4 Claims

ABSTRACT OF THE DISCLOSURE

The invention is concerned with novel 2-amino-1,3,4-oxadiazole ring comprising nitrofurans of the formula

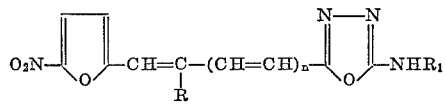

in which R is hydrogen, an alkyl group of 1 to 5 carbon atoms or phenyl group when $n$ is 0, and an alkyl group of 1 to 5 carbon atoms when $n$ is 1; $n$ is an integer of 0 or 1; and $R_1$ is an alkyl group of 1 to 5 carbon atoms.
The compounds exert antibacterial activity.

---

This is a continuation-in-part of our copending application Ser. No. 314,524, filed Oct. 7, 1963, now abandoned.

This invention relates to new chemical compounds. More particularly, it is concerned with new nitrofuran derivatives having 2-unsubstituted or substituted amino-1,3,4-oxadiazole ring represented by the formula

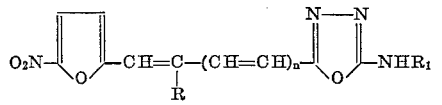

wherein R is hydrogen, a lower alkyl group which may be either straight or branched and contains 1 to 5 carbon atoms such as methyl, ethyl, propyl, isopropyl, n-butyl, isobutyl, n-amyl or isoamyl, an unsubstituted or substituted phenyl group such as phenyl, p-nitrophenyl, p-chlorophenyl or p-methoxyphenyl when $n$ is 0 and a lower alkyl group which may be either straight or branched and contains from 1 to 5 carbon atoms such as methyl, ethyl, propyl, isopropyl, n-butyl, isobutyl, n-amyl or isoamyl when $n$ is 1; $n$ is an integer 0 or 1; and $R_1$ is hydrogen, a lower alkyl group which may be either straight or branched and contains from 1 to 5 carbon atoms such as methyl, ethyl, propyl, isopropyl, n-butyl, isobutyl, n-amyl, or isoamyl, or an unsubstituted or substituted phenyl group such as phenyl, p-nitrophenyl, p-chlorophenyl or p-methoxyphenyl.

The 5-nitro-2-furyl compounds having the above-described Formula I are novel compounds unknown in the prior art and possess potent antibacterial activities.

It is an object of the present invention to provide novel 5-nitro-2-furyl compounds having the above-described Formula I useful as antibacterial agents. Another object is the provision of a process for the preparation of said compounds. Other objects will become apparent from the following description.

According to the present invention, the 5-nitro-2-furyl compounds having the above-described Formula I may be prepared by reacting a 5-nitro-2-furyl compound having the formula

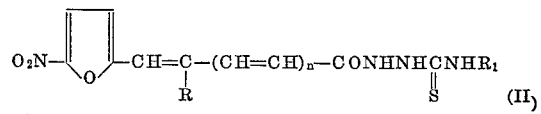

wherein R, $R_1$ and $n$ have the same meanings as described above with $R_2X$ wherein $R_2$ is a lower alkyl group which may be either straight or branched and contains from 1 to 5 carbon atoms such as methyl, ethyl, propyl, isopropyl, n-butyl, isobutyl, n-amyl or isoamyl and X is chlorine, bromine or iodine atom, in an inert solvent in the presence of an acid binding agent and heating the resulting compound having the formula

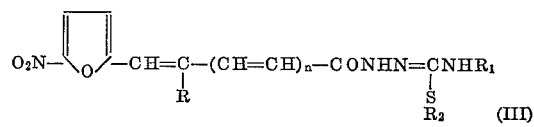

wherein R, $R_1$, $R_2$ and $n$ have the same meanings as set forth above in an inert solvent.

In carrying out the first step of the process according to the present invention, the reaction is preferably carried out in an inert organic solvent such as alcohols, for example, methanol, ethanol, propyl alcohol, butyl alcohol and the like; glycols, for example, ethylene glycol, propylene glycol and the like; ketones, for example, dimethylketone, methylethylketone, diethylketone and the like; dioxane, tetrahydrofuran; amides, for example, dimethylformamide, dimethylacetamide and the like; ethers, for example, ethylether, ethyleneglycol monomethyl ether, ethylene glycol monoethyl ether in the presence of an acid binding agent such as alkali metal hydroxides, carbonates or bicarbonates, for example, sodium hydroxide, potassium hydroxide, sodium carbonate, potassium carbonate and sodium bicarbonate. The reaction temperature is at first room temperature and then raised to about 50–140° C., but this may be raised or lowered, if desired. The reaction is usually effected by adding dropwise a solution of an acid binding agent in an inert solvent to a stirred supension of the 5-nitro-2-furyl compound having the Formula II and excess amount of alkyl halide in an inert solvent at room temperature. A dark red or brown solution is formed from which crystals are soon or slowly precipitated. The mixture is stirred at room temperature for 1–8 hours and warmed to 30–60° C. over 1–6 hours to complete the reaction.

After completion of the reaction, the reaction product may be isolated from the reaction mixtures by one of the conventional methods. For example, cooling of the reaction mixture provides the desired product, which is filtered, washed and dried. If necessary, the reaction mixture is concentrated to give the desired product.

In the second step of the process of this invention, the resulting compound having the Formula III is heated at 60–150° C. in such an inert solvent as described in the first step for 1–5 hours. In this step, the inert solvent having the higher boiling point than 60° C. is preferably selected. In such a case where the first step is carried out in an inert solvent having the higher boiling point than 60° C. such as ethyl alcohol, dimethylformamide, ethylene glycol monomethyl ether and propylene glycol, a mixture containing the desired compound may be used and heated in the second step without isolation of it from the reaction mixture.

After completion of the second reaction, the reaction product may be isolated from the reaction mixture by one of the conventional methods. For example, cooling of the reaction mixture provides the desired product, which is filtered, washed and dried. If necessary, the reaction mixture is concentrated to give the desired product.

The starting material in the process of this invention having the above-described Formula II may be obtained by reacting 5-nitro-2-furyl compounds having the formula

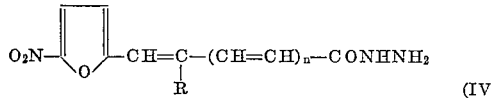

$$O_2N-\underset{O}{\underset{|}{\bigcirc}}-CH=C-(CH=CH)_n-CONHNH_2 \quad (IV)$$
                        |
                        R wherein R and n have the same meanings as set forth above with alkylisothiocyanate in an inert organic solvent.

The following examples are given for the purpose of illustrating the present invention, but are not intended to be limiting on the scope thereof.

Example 1.—Preparation of 2-amino-5-(5-nitrofurylethenyl)-1,3,4-oxadiazole (a)(i) To a stirred suspension of 8.7 g. of 5-nitrofurylacroyl thiosemicarbazide and 14 g. of methyl iodide in 150 ml. of ethyl alcohol is added dropwise in an alcoholic solution containing 2 g. of potassium hydroxide at room temperature. A dark red solution is formed from which yellow scale crystals are precipitated. The reaction temperature is gradually raised to 50° C. over 4 hours to complete the reaction. After cooling, the crystal is collected by filtration and washed with a dilute aqueous solution of potassium carbonate and water to give 7.6 g. (84% of the theoretical amount) of 5-nitrofurylacroyl-S-methylisothiosemicarbazide as yellow crystals melting at 171–172° C. (dec.).

(ii) The procedure of a,(i) is followed in the same may be above using ethyl iodide instead of methyl iodide to give crystals of 5-nitrofurylacroyl-S-ethylisothiosemicarbazide melting at 160° C. (dec.).

(iii) To a suspension of 2 g. of 5-nitrofurylacroylthiosemicarbazide in 50 ml. of acetone is added 0.6 g. of anhydrous potassium carbonate and 3.5 g. of methyl iodide and the reaction mixture is heated under reflux for 3 hours. Cooling provides 1.6 g. of the same desired product as in above-described (a)(i) melting at 170° C. (dec.).

(b)(i) A mixture of 0.5 g. of 5-nitrofurylacroyl-S-methylisothiosemicarbazide in 5 ml. of dimethylformamide is heated at 130–140° C. for 2 hours. 0.5 ml. of water is added and the mixture is cooled to give 0.21 g. (51.2% of the theoretical amount) of yellow scale crystals melting at 271° C. (dec.).

(ii) A mixture of 1 g. of 5-nitrofurylacroyl-S-methylisothiosemicarbazide in 11 ml. of ethylene glycol monomethylether is heated at 90° C. to complete solution and then at 115–120° C. to liberate mercaptan gas. Yellow scale crystals are precipitated. After cooling, the product is filtered and washed with acetone to give 1.15 g. (70% of theoretical) of the desired product melting at 270° C. (dec.).

Example 2.—Preparation of 2-amino-5[1-phenyl-2-(5-nitrofuryl)ethenyl]-1,3,4-oxadiazole (a) To a stirred suspension of 0.4 g. of 2-phenyl-3-(5-nitrofuryl) acroylthiosemicarbazide and 1 ml. of methyl iodide in 10 ml. of ethyl alcohol is added dropwise 2.2 ml. of alcoholic solution containing 0.07 g. of potassium hydroxide at room temperature. A dark red solution is formed from which red scale crystals are precipitated. The mixture is kept at 25–30° C. for 2 hours. The product is filtered and washed with water to give 0.42 g. (97% of theoretical) of dark red scale crystals melting at 236° C. (dec.).

(b) A suspension of 1 g. of 2-phenyl-3-(5-nitrofuryl) acroyl S-methylisothiosemicarbazide prepared as above in 30 ml. of ethyl alcohol is heated under reflux for 1 hour. The mixture dissolves and mercaptan liberates. The solution is filtered while hot and and the filtrate is concentrated and cooled to give 0.73 g. of yellow needles melting at 192° C. (dec.).

Example 3.—Preparation of 2-methylamino-5-(5-nitrofurylethenyl)-1,3,4-oxadiazole (a)(i) To a stirred suspension of 2 g. of $N^1$-(5-nitrofurylacroyl)$N^4$-methylthiosemicarbazide and 1.5 ml. of methyliodide in 40 ml. of ethyl alcohol is added dropwise 15 ml. of ethanolic solution containing 0.47 g. of potassium hydroxide. A dark red solution is formed from which a large amount of crystals is precipitated. The mixture is stirred at room temperature for 5 hours.

The product is filtered and washed with water and alcohol to give 1.73 g. (82.5% of theoretical amount) of $N^1$ - (5 - nitrofurylacroyl)$N^4$ - methyl - S - methylisothiosemicarbazide as yellow needles melting at 163° C.

(ii) To a stirred mixture of 0.5 g. of $N^1$-(5-nitrofurylacroyl)$N^4$-methylthiosemicarbazide and 0.36 ml. of methyl iodide in 15 ml. of ethyl alcohol is added dropwise 3.3 ml. of alcoholic solution containing 0.104 g. of potassium hydroxide. A dark red solution is formed from which red-orange or yellow-orange crystals are precipitated in about 30 minutes and gradually turns to yellow-orange. The mixture is kept at room temperature for 2 hours and is slowly raised to 75–80° C. at which temperature it is kept for 2 hours. The mixture dissolves completely, mercaptan liberates and then yellow-orange crystals precipitate. After cooling, the crystals are filtered and washed with water to give 0.27 g. (61.8% of theoretical) of red-orange powders melting at 217–218° C. with decomposition. Crystallization from ethylene glycol monomethyl ether gives yellow-orange needles melting at 223° C. (dec.).

In the above Example 3, (a)(i) and (ii), the reaction may be carried out in the same way as above using ethyl iodide or butyl iodide instead of methyl iodide.

(b) A mixture of 0.5 g. of $N^1$-(5-nitrofurylacroyl)-$N^4$-methyl-S-methylisothiosemicarbazide and 7 ml. of ethylene glycol monomethyl ether is slowly heated to liberate mercaptan gas and kept at 100–110° C. for 30 minutes. The solution is filtered while hot and, after cooling, the filtrate provides pure yellow-orange needles melting at 223–224° C. (dec.), weighing 0.32 g. (77% of theoretical).

In the above Example 3(b), the reaction may be carried out in the same way as above using ethyl alcohol or isopropyl alcohol instead of ethylene glycol monomethylether.

Example 4.—Preparation of 2-methylamino-5-[1-methyl-2-(5-nitrofuryl)ethenyl]-1,3,4-oxadiazole (a) To a stirred suspension of 0.9 g. of $N^1$-[2-methyl-3 - (5-nitrofuryl)acroyl]-$N^4$-methylthiosemicarbazide and 0.4 ml. of methyl iodide in 20 ml. of ethyl alcohol is added dropwise 5.5 ml. of alcoholic solution containing 0.18 g. of potassium hydroxide and the mixture is kept at room temperature for 4 hours. The mixture provides yellow-orange crystals of $N^1$-[2-methyl-3-(5-nitrofuryl) acroyl] - $N^4$-methyl-S-methylisothiosemicarbazide melting at 205° C. (dec.) which is recovered by filtration and used in the following reaction. The mixture is heated at 60° C. for 30 minutes without isolating the product. After cooling, the mixture affords 0.45 g. of crude crystals melting at 222–223° C. (dec.), which is filtered and washed with water and alcohol. Crystallization from ethylene glycol monomethylether gives yellow scales melting at 224° C. (dec.). In the above Example 4(a) the reaction is followed in the same way as above using ethyl iodide or n-butyl iodide instead of methyl iodide.

(b) A suspension of 0.5 g. of $N^1$-[2-methyl-3-(5-nitrofuryl)acroyl] - $N^4$ - methyl-S-methylisothiosemicarbazide and 7 ml. of propylene glycol is slowly heated to liberate mercaptan gas and refluxed for 30 minutes. Cooling provides yellow crystals which are filtered and washed with a small amount of alcohol. In this way, there are obtained 0.32 g. (76% of theoretical) of yellow needles melting at 224° C. (dec.).

The above Example 4(b) is followed in the same way as above using 0.5 g. of $N^1$-[2-(methyl-3-(5-nitrofuryl) acroyl]-$N^4$-methyl-S-ethylisothiosemicarbazide and 20 ml. of ethyl alcohol to obtain the corresponding desired product.

Example 5.—Preparation of 2-methylamino-5-[1-ethyl-2-(5-nitrofuryl)ethenyl]-1,3,4-oxadiazole To a stirred suspension of 10.4 g. of $N^1$-[2-ethyl-3-(5-nitrofuryl)acroyl]-$N^4$-methylthiosemicarbazide and 0.65 g. of methyl iodide in 25 ml. of ethyl alcohol is added dropwise 6 ml. of alcoholic solution containing 0.2 g. of potassium hydroxide. A dark red solution is formed from which yellow needles are precipitated and the mixture is kept at room temperature for 3 hours. The mixture is then slowly heated to 60° C. to complete solution. The solution is kept at 60° C. for 2 hours. After cooling, the crystalline material which precipitates is filtered and washed with water and alcohol to give 0.65 g. (70.5% of theoretical) of yellow needles melting at 190° C. (dec.).

In the above Example 5, the reaction is followed in the same way as above using ethyl iodide or n-propyl iodide instead of methyl iodide.

$N^1$ - [2-ethyl-3-(5-nitrofuryl)acroyl] - $N^4$ - methyl - S-methylisomethylthiosemicarbazide melting at 145–146° C. may be isolated in the course of the reaction and heated in ethylene glycohol monomethylether. There is obtained the desired product as orange needles melting at 190° C. (dec.).

Example 6.—Preparation of 2-methylamino-5-[1-phenyl-2-(5-nitrofuryl)ethenyl)-1,3,4-oxadiazole (a) To a stirred suspension of 0.92 g. of $N^1$-[2-phenyl-3-(5-nitrofuryl)acroyl]-$N^4$- methylthiosemicarbazide and 0.51 g. of methyl iodide in 20 ml. of ethyl alcohol is added dropwise 4.8 ml. of ethyl alcoholic solution containing 0.15 g. of potassium hydroxide. A dark red solution is formed from which a large amount of dark red scales is precipitated. The mixture is stirred at room temperature for 4 hours. The product is filtered and washed with water and alcohol to give 0.75 g. (78.2% of theoretical amount) of $N^1$-[2-phenyl-3-(5-nitrofuryl)acroyl]-$N^4$-methyl-S-methyl isothiosemicarbazide as red-orange scales melting at 171° C. with decomposition. In the same way, $N^1$-[2-phenyl-3-(5-nitrophenyl)acroyl]-$N^4$-methyl-S-ethylisothiosemicarbazide melting at 220° C. (dec.) is obtained using ethyl iodide instead of methyl iodide.

(b) To a stirred suspension of 1.6 g. of $N^1$-[2-phenyl-3-(5-nitrofuryl)acroyl]-$N^4$-methylthiosemicarbazide and 1 ml. of methyl iodide in 30 ml. of ethyl alcohol is added dropwise 7.9 ml. of alcoholic solution containing 0.26 g. of potassium hydroxide. A dark red solution is formed from which crystals are precipitated. The mixture is kept at room temperature for 3.5 hours and warmed to 50° C. to complete solution and begins to liberate mercaptan. The solution is kept at 60° C. for 2 hours and 20 ml. of water is added to the solution and the solution is refluxed and filtered while hot. Cooling provides crystals which are filtered to give yellow needles melting at 123–124° C. (dec.) weighing 1.45 g. (98.5% of theoretical amount).

(c) $N^1$ - [2-phenyl-3-(5-nitrofuryl)acroyl]-$N^4$-methyl-S-methylisothiosemicarbazide is heated under reflux in ethyl alcohol for 2 hours. The desired product is obtained in the same way as above. In this reaction, ethylene glycol monomethylether may be used instead of ethyl alcohol.

Example 7.—Preparation of 2-ethylamino-5-(5-nitrofuryl-ethenyl)-1,3,4-oxadiazole (a) To a stirred suspension of 1 g. of $N^1$-(5-nitrofuryl-acroyl)-N-ethylthiosemicarbazide and 0.7 ml. of methyl iodide in 20 ml. of ethyl alcohol is added slowly 6.3 ml. of ethyl alcoholic solution containing 0.2 g. of potassium hydroxide and followed in the same procedure as described in Example 3 to give orange-yellow needles melting at 229° C. (dec.) weighing 0.72 g. (81.5% of thoretical).

Example 8.—Preparation of 2-ethylamino-5[1-methyl-2-(5-nitrofuryl)ethenyl]-1,3,4-oxadiazole To a stirred suspension of 1 g. of $N^1$-[2-methyl-3-(5-nitrofuryl)acroyl]-$N^4$-ethylthiosemicarbazide and 0.7 ml. of methyl iodide in 20 ml. of ethyl alcohol is added dropwise 6.1 ml. of alcoholic solution containing 0.19 g. of potassium hydroxide and followed in the same procedure as described in Example 4 to give yellow needles melting at 208.5° C. (dec.), weighing 0.68 g. (77.5% of theoretical).

Example 9.—Preparation of 2-ethylamino-5-[1-ethyl-2-(5-nitrofuryl)ethenyl)-1,3,4-oxadiazole (a) To a stirred suspension of 1 g. of $N^1$-[2-ethyl-3-(5-nitrofuryl)acroyl]-$N^4$-ethylthiosemicarbazide and 0.7 ml. of methyl iodide in 20 ml. of ethyl alcohol is added dropwise 5.8 ml. of alcoholic solution containing 1.05 g. of potassium hydroxide and the mixture is kept at room temperature for 4 hours to give a large amount of red-yellow crystals. The mixture is then warmed to 70–80° C. for 2 hours to liberate mercaptan gas. Cooling provides crystals which are filtered and washed with water and alcohol to give yellow needles melting at 191–192° C. (dec.), weighing 0.65 (78% of theoretical).

(b) A mixture of 0.78 g. of $N^1$-[2-ethyl-3-(5-nitrofuryl)acroyl]$N^4$-ethyl-S-methylisothiosemicarbazide melting at 180° C. (dec.) obtained in the course of the above mentioned reaction and 10 ml. of ethylene monomethylether is heated under reflux for 1 hour and a small amount of water is added, followed by cooling, to give yellow needles melting at 192° C. (dec.), weighing 0.52 g. (78.2% of theoretical).

Example 10.—Preparation of 2-butylamino-5-[1-phenyl-2-(5-nitrofuryl)ethenyl]-1,3,4-oxadiazole (a) To a stirred suspension of 1 g. of $N^1$-[2-phenyl-3-(5-nitrofuryl)acroyl]-$N^4$-ethylthiosemicarbazide and 0.6 of methyl iodide in 20 ml. of ethyl alcohol is added slowly 5.4 ml. of ethyl alcoholic solution containing 0.17 g. of potassium hydroxide. A dark red solution is formed from which a large amount of dark red crystals is precipitated. The mixture is stirred at room temperature for 4 hours. The product is filtered and washed with water and a small amount of alcohol to give red-orange scales of $N^1$-[2-phenyl-3-(5-nitrofuryl)acroyl]$N^4$ - ethyl-S - methylisothiosemicarbazide melting at 202° C. (dec.), weighing 0.08 g. (65.4% of theoretical amount).

(b) To a stirred suspension of 0.8 g. of $N^1$-[2-phenyl-3-(5-nitrofuryl)acroyl]-$N^4$-ethylthiosemicarbazide and 0.43 ml. of methyl iodide in 20 ml. of ethyl alcohol is added dropwise 3.8 ml. of alcoholic solution containing 0.125 g. of potassium hydroxide. A dark red solution is formed from which red-orange crystals are precipitated and the solution is kept for 4 hours at room temperature and then is slowly warmed to liberate the mercaptan, followed by refluxing for 3 hours. Water is added to the solution. The solution is filtered while hot, and cooling of the filtrate gives yellow-orange needles melting at 174–175° C. (dec.), weighing 0.62 g. (85% of theoretical).

(c) A mixture of 0.6 g. of $N^1$-[2-phenyl-3-(5-nitrofuryl)acroyl]-$N^4$-ethyl-S-methylisothiosemicarbazide and 10 ml. of propyl alcohol is heated under reflux and a small amount of water is added to the solution, followed by filtration while hot, to give yellow-orange needles melting at 176–178° C. (dec.), weighing 0.46 g.

Example 11.—Preparation of 2-n-butylamino-(5-nitro-furylethenyl)-1,3,4-oxadiazole (a) To a stirred suspension of 0.8 g. of $N^1$-(5-nitro-furylacroyl)-$N^4$-n-butylthiosemicarbazide and 0.5 g. of methyl iodide in 20 ml. of ethyl alcohol is added dropwise 4.5 ml. of ethyl alcoholic solution containing 0.14 g. of potassium hydroxide. A dark red solution is formed from which yellow-brown crystals are precipitated. The mixture is stirred at room temperature for 6 hours, filtered and washed with water and a small amount of alcohol to give yellow-brown needles of $N^1$-(5-nitrofurylacroyl)-N-n-butyl-S - methylisothiosemicarbazide melting at 184° C. (dec.), weighing 0.78 g. (93.4% of theoretical amount).

(b) To a stirred suspension of 0.8 g. of $N^1$-(5-nitrofurylacroyl)-$N^4$-n-butylthiosemicarbazide and 0.5 ml. of methyl iodide in 20 ml. of ethyl alcohol is added dropwise 4.5 ml. of alcoholic solution containing 0.15 g. of potassium hydroxide and the mixture is kept at room temperature and warmed at 70–80° C. for 4 hours to liberate mercaptan gas. Cooling of the solution provides crystals which are filtered to give yellow-orange needles melting at 139° C. (dec.), weighing 0.61 g. (86% of theoretical).

(c) A mixture of 0.72 g. of $N^1$-(5-nitrofurylacroyl)-$N^4$-n-butyl-S-methylisothiosemicarbazide obtained in the course of the above mentioned reaction and 10 ml. of ethylene glycol monomethylether is heated under reflux for 1 hour and a small amount of water is added. The solution is filtered while hot and cooled to give yellow-orange needles melting at 139° C. (dec.), weighing 0.43 g. (70% of theoretical).

Example 12.—Preparation of 2-n-butylamino-5-[1-methyl-2(5-nitrofuryl)ethenyl]-1,3,5-oxadiazole (a) To a stirred suspension of 0.5 g. of $N^1$-[2-methyl-3-(5-nitrofuryl)acroyl]-$N^4$-n - butylthiosemicarbazide and 0.3 ml. of methyl iodide in 10 ml. of ethyl alcohol is added slowly 2.74 ml. of alcoholic solution containing 0.086 g. of potassium hydroxide. A dark red solution is formed from which crystals are precipitated. The mixture is kept at room temperature for 2 hours and then slowly heated to 55° C. to complete solution, followed by liberate mercaptan and heated at 70–75° C. for 2 hours. On cooling, there are obtained crystals which are filtered and washed with water and a small amount of alcohol to give yellow needles melting at 195–196° C. (dec.), weighing 0.42 g. (80.7% of theoretical).

(b) A mixture of 0.62 g. of $N^1$-[2-methyl-3-(5-nitrofuryl) acroyl]$N^4$-n-butyl - S - methylisothiosemicarbazide obtained in the course of the above mentioned reaction and 10 ml. of ethylene glycol monomethylether is refluxed for 1 hour to liberate mercaptan gas, filtered, while hot and diluted with a small amount of water to give yellow needles melting at 198° C. (dec.), weighing 0.47 g. (88% of theoretical amount).

Example 13.—Preparation of 2-n-butylamino-5-[1-ethyl-2-(5-nitrofuryl)ethenyl]1,3,4-oxadiazole (a) To a stirred suspension of 0.8 g. of $N^1$-[2-ethyl-3-(5-nitrofuryl)acroyl]$N^4$ - n - butylthiosemicarbazide and 0.45 ml. of methyl iodide in 15 ml. of ethylene-glycol-monomethylether is added slowly 4.1 ml. of alcoholic solution containing 1.08 g. of potassium hydroxide and the mixture is kept at room temperature for 4 hours to give a large amount of crystals. The mixture is heated at 120–125° C. for 1 hour and filtered while hot. On cooling the filtrate gives red-orange needles melting at 159–160° C. (dec.), weighing 0.54 g. (75% of theoretical amount).

(b) A mixture of 0.6 g. of $N^1$-[2-ethyl-3-(5-nitrofuryl)acroyl]-$N^4$-n-butyl-S - methylisothiosemicarbazide melting at 158° C. (dec.) obtained in the course of the above mentioned reaction and 10 ml. of ethylene glycol monomethylether is heated under reflux for 1 hour and the mixture is filtered while hot to give red-orange needles melting at 158–160° C. (dec.), weighing 0.38 g. (75% of theoretical).

Example 14.—Preparation of 2-n-butylamino-5-[1-phenyl-2-(5-nitrofuryl)ethenyl]1,3,4-oxadiazole (a) To a stirred mixture of 0.8 g. of $N^1$-[2-phenyl-3-(5-nitrofuryl)acroyl]$N^4$-n-butylthiosemicarbazide and 0.4 ml. of methyl iodide in 20 ml. of ethyl alcohol is added dropwise 3.6 ml. of alcoholic solution containing 0.12 g. of potassium hydroxide. A dark red solution is formed from which red crystals are precipitated. The mixture is kept at room temperature for 2 hours and then heated to 70–80° C. for 2 hours to complete solution, followed by liberating mercaptan. The solution is diluted with a small amount of water, filtered while hot and cooled to give, yellow needles melting at 155–158° C. (dec.), weighing 0.72 g. (100% of theoretical).

(b) A mixture of 0.6 g. of $N^1$-[2-phenyl-3-(5-nitrofuryl)acroyl]-$N^4$-n-butyl - S - methylisothiosemicarbazide melting at 243° C. (dec.) obtained in the course of the above mentioned reaction and 10 ml. of ethylene glycol monomethyl ether is heated under reflux for 1 hour and is filtered while hot to give yellow needles melting at 155–158° C. (dec.), weighing 0.48 g.

Example 15.—Preparation of 2-phenylamino-5-(5-nitrofurylethenyl)-1,3,4-oxadiazole (a) To a stirred mixture of 0.8 g. of $N^1$-(5-nitrofurylacroyl)-$N^4$-phenylthiosemicarbazide and 0.47 ml. of methyl iodide in 20 ml. of methyl alcohol is added dropwise 4.3 ml. of alcoholic solution containing 0.14 g. of potassium hydroxide. A dark red solution is formed from which red-orange crystals are precipitated in about 10 minutes and the solution is kept at room temperature for 4 hours to give crystals which are filtered and washed with water and a small amount of alcohol. In this way, there are obtained 0.78 g. (93.5% of theoretical amount) of pale yellow crystals melting at 187° C. (dec.).

(b) A mixture of 0.5 g. of $N^1$-(5-nitrofurylacroyl)-$N^4$-phenyl-S-methylisothiosemicarbazide and 7 ml. of ethylene glycol monomethylether is heated under reflux for 1 hour and filtered while hot to give 0.38 g. (88.5% of theoretical amount) of yellow needles melting at 253° C. (dec.).

(c) To a stirred mixture of 0.8 g. of $N^1$-(5-nitrofurylacroyl)-$N^4$-phenylthiosemicarbazide and 0.47 g. of methyl iodide in 20 ml. of ethyl alcohol is added dropwise 4.3 ml. of ethyl alcoholic solution containing 0.13 g. of potassium hydroxide. A dark red solution is formed from which red crystals are precipitated. The mixture is kept at room temperature for 4 hours and then warmed at 70–80° C. for 2 hours. Cooling provides crystals which are collected by filtration and wshed with water and alcohol to give 0.71 g. (98.6% of theoretical) of yellow needles melting at 222–223° C. (dec.). Crystallization from ethylene glycol-monomethylether raises the melting point to 251° C. with decomposition.

Example 16.—2-phenylamino-5-[1-methyl-2(5-nitrofuryl)ethenyl]1,3,4-oxadiazole (a) To a stirred mixture of 0.8 g. of $N^1$-[2-methyl-3(5-nitrofuryl)acroyl]-$N^4$-phenylthiosemicarbazide and 0.45 g. of methyl iodide in 20 ml. of ethyl alcohol is added dropwise 4.1 ml. of alcoholic solution containing 0.13 g. of potassium hydroxide. A dark red solution is formed from which dark brown crystals are precipitated. The mixture is stirred at room temperature for 4 hours and slowly warmed to 40–50° C. to give a large amount of crystals. The mixture is then heated at 70–80° C. for 2 hours to liberate mercaptan and complete solution and the solution is filtered while hot. On cooling, the filtrate gives crystals which are collected by filtration and washed with water and alcohol. Crystallization from aqueous dimethylformamide affords 0.44 g. (61% of theoretical amount) of yellow needles melting at 278° C. (dec.).

(b) A mixture of 0.5 g. of $N^1$-(5-nitrofurylacroyl)-$N^4$-phenyl-S-methylisothiosemicarbazide and 7 ml. of ethylene glycol monomethylether is heated under reflux and filtered while hot to give yellow needles melting at 278° C. (dec.).

Example 17

(a) To a stirred mixture of 0.8 g. of $N^1$-[2-phenyl-3-(5-nitrofuryl)acroyl]-$N^4$-phenylthiosemicarbazide and 0.37 g. of methyl iodide in 15 ml. of ethylene glycol monomethylether is added dropwise 3.5 ml. of alcoholic solution containing 0.12 g. of potassium hydroxide and the mixture is stirred at room temperature for 4 hours. The mixture is warmed at 90–100° C. for 2 hours to liberate mercaptan and complete solution. The solution is diluted with a small amount of water and filtered while hot. On cooling, the filtrate gives 0.61 g. (81% of theoretical amount) of yellow-orange needles metlting at 221–222° C. (dec.).

(b) A mixture of 0.6 g. of $N^1$-[2-phenyl-3-(5-nitrofuryl)acroyl] - $N^4$ - phenyl - S - methylisothiosemicarbazide melting at 170–171° C. (dec.) obtained in the course of the above mentioned reaction, and 10 ml. of ethylene glycol monomethylether is heated under reflux and filtered while hot to give yellow-orange needles melting at 221° C. with decomposition.

Example 18.—2-methylamino-5-[3-methyl-4-(5-nitrofuryl)butenyl]-1,3,4-oxadiazole (a) To a stirred mixture of 0.5 g. of $N^1$-[4-methyl-5-(5 - nitrofuryl)2,4 - pentadienoyl] - $N^4$ - methylthiosemicarbazide and 0.70 g. of methyl iodide in 15 ml. of ethylene glycol monomethylether is added dropwise 5 ml. of ethanolic solution containing 0.09 g. of potassium hydroxide. A dark red solution thus formed is stirred at room temperature for 3 hours to give slowly brown crystals. The mixture is heated at 100–120° C. for 2 hours and filtered from insoluble material. The filtrate is concentrated under reduced pressure and the product is precipitated by the addition of water to give 0.34 g. of brown crystals. Crystallization from 20% aqueous dimethylformamide gives red-brown crystals, M.P. 238–240° C. (dec.).

(b) A mixture of 0.66 g. of $N^1$-[4-methyl-5-(5-nitrofuryl) - 2,4 - pentadienoyl] - $N^4$ - methyl - S - methylisothiosemicarbazide melting at 210–213° C. (dec.) obtained in the course of the above mentioned reaction and 15 ml. of ethylene glycol monomethylether is heated at 100–120° C. for 2 hours to liberate mercaptan and complete solution. The solution is filtered from insoluble material and concentrated under reduced pressure, followed by addition of water to give 0.37 g. of crystals which are collected by filtration. Crystallization from 20% dimethylformamide gives red-brown crystals melting at 239–240° C. (dec.).

Example 19.—2-ethylamino-5-[3-methyl-4(5-nitrofuryl)butadienyl]-1,3,4-oxadiazole (a) To a stirred mixture of 0.57 g. of $N^1$-[-methyl-5-(5-nitrofuryl - 2,4 - pentadienoyl] - $N^4$ - ethylthiosemicarbazide and 0.75 g. of methyl iodide in 20 ml. of dioxan is added dropwise 5 ml. of ethanolic solution containing 0.098 g. of potassium hydroxide. A red solution which forms is stirred at room temperature for 7 hours to give brown crystals which are collected by filtration. In this way there is obtained 0.46 g. of $N^1$-[4-methyl-5-(5-nitrofuryl)]-S-methylisothiosemicarbazide melting at 165–168° C. (dec.).

(b) A mixture of the compound obtained in the above reaction and 25 ml. of dimethylformamide is heated at 100–120° C. for 2 hours and is filtered while hot. On cooling, the filtrate gives 0.18 g. (45.5% of theoretical amount) of small brown crystals melting at 177–178° C. (dec.).

Example 20.—2-methylamino-5-[3-ethyl-4(5-nitrofuryl)butadienyl]1,3,4-oxadiazole (a) To a stirred mixture of 0.6 g. $N^1$-[4-ethyl-5-(5-nitrofuryl)2.4 - pentadienoyl] - $N^4$ - methylthiosemicarbazide and 0.85 g. of methyl iodide in 20 ml. of ethyl alcohol is added dropwise 5 ml. of ethanolic solution containing 0.115 g. of potassium hydroxide. A bright red solution which forms is stirred at room temperature for 6 hours to give 0.44 g. of brown crystals melting at 167–168° C. (dec.), which is collected by filtration.

(b) A mixture of the compound obtained in the above reaction and 3 ml. of ethylene glycol monomethylether is heated at 100–120° C. for 4 hours to liberate mercaptan and complete solution. The solution is filtered from insoluble material and cooled to give orange crystals melting at 189–190° C.

(c) In the above reaction, the reaction may be carried out using 10 ml. of ethylene glycol monomethylether instead of 20 ml. of ethyl alcohol and heated at 100–120° C. for 4 hours to give the desired product.

Example 21.—2-ethylamino-5-[3-ethyl-4-(5-nitrofuryl)butadienyl]-1,3,4-oxadiazole To a stirred mixture of 0.6 g. of $N^1$-[4-ethyl-5-(5-nitrofuryl)-2.4-pentadienoyl]-$N^4$ - ethylthiosemicarbazide and 0.85 g. of methyl iodide in 20 ml. of ethylene glycol monomethylether is added dropwise 5 ml. of ethanolic solution containing 0.12 g. of potassium hydroxide. A dark red solution is formed from which crystals are precipitated. The mixture is stirred at room temperature for 6 hours to give crystals of $N^1$-[4-ethyl-5-(5-nitrofuryl)2.4-pentadienoyl]-$N^4$-ethyl-S-methylisothiosemicarbazide. The mixture is heated at 100–120° C. for 3 hours and filtered from insoluble material. The filtrate is concentrated under reduced pressure and diluted with water to give 0.34 g. of dark brown crystals. Crystallization from 20% dimethylformamide gives brown crystals melting at 174–177° C. (dec.).

Certain 5-nitrofuryl compounds have been disclosed in U.S. Patent 3,260,716 which upon first glance may seem closely related to the present compounds. However, the different substituents in the 5-position of the 1,3,4-oxadiazole ring have proved to be decisive in respect to the biological, including antibacterial, activity of the compounds.

It has thus been ascertained that the nitrofurans of this invention exhibit far more pronounced growth-inhibiting activity toward Trychophyton than the compounds of U.S. Patent 3,260,716. Further, the present compounds are superior to the patented compounds in respect to their protective effect against bacterial infection. Moreover, their absorption and urinary excretion characteristics in respect to living bodies are far better than those of the compounds of the prior patent. The superiority of the present compounds in comparison with the compounds of the prior patent is apparent from the following experimental results.

EXPERIMENTAL RESULTS

Test compounds (I)  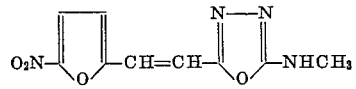

2-Methylamino-5-(5-nitrofuryl-ethenyl)-1,3,4-oxadiazole (included within the scope of this invention)

(II) $O_2N$—furyl—CH=CH—oxadiazole—$NH_2$ (included within the scope of U.S. Patent 3,260,716)

2-Amino-5-(5-nitrofuryl-ethenyl)-1,3,4-oxadiazole)

RESULTS

I. Growth-inhibiting activities of the test compounds against Trichophyton (mcg./ml.)

| Test compound | Trichophyton mentagrophytes 810 | Trichophyton rubrum 825 | Trichophyton interdigitale 841 | Trichophyton interdigitale Yoshida |
|---|---|---|---|---|
| I | 25 | | 50 | |
| II | 50 | 50 | 100 | 100 |

II. Protective effect of the test compounds against bacterial infection in mice

| Strain | Test compound | |
|---|---|---|
| | II | I |
| | ED$_{50}$ (mg./kg.) | |
| Streptomyces pyogenes (S-43-M) | 313.3 | 237.9 |
| Escherichia coli (O-6) | 341.7 | 171.3 |

III. Urinary excretion in human after oral administration

The urinary excretion values are apparent from the single figure of the drawing.

What is claimed is:

1. A compound of the formula

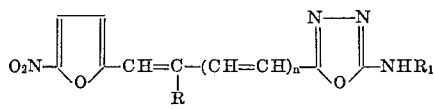

in which R is hydrogen, an alkyl group of 1 to 5 carbon atoms or phenyl group when $n$ is 0, and an alkyl group of 1 to 5 carbon atoms when $n$ is 1; $n$ is an integer of 0 or 1; and $R_1$ is an alkyl group of 1 to 5 carbon atoms.

2. 2 - methylamino-5-(5-nitrofurylethenyl)-1,3,4-oxadiazole.

3. 2-methylamino-5-[1-methyl - 2 - (5 - nitrofuryl)-ethenyl]-1,3,4-oxadiazole.

4. 2 - methylamino-5-[3-methyl-4-(5-nitrofuryl)-butadienyl]-1,3,4-oxadiazole.

References Cited

UNITED STATES PATENTS 3,260,716  7/1966  Takai et al. _____ 260—240
3,303,188  2/1967  Takai et al. _____ 260—240

JOHN D. RANDOLPH, Primary Examiner

U.S. Cl. X.R.

260—347.2, 347.3, 999